United States Patent [19]
Wakasugi

[11] Patent Number: 6,157,937
[45] Date of Patent: Dec. 5, 2000

[54] HIGH SPEED INTERPOLATION CIRCUIT WITH SMALL CIRCUIT SCALE

[75] Inventor: Makoto Wakasugi, Tokyo, Japan

[73] Assignee: NEC Corporation, Tokyo, Japan

[21] Appl. No.: 09/116,961

[22] Filed: Jul. 17, 1998

[30] Foreign Application Priority Data

Jul. 17, 1997 [JP] Japan .................................. 9-192585

[51] Int. Cl.⁷ .................................................. G06F 17/17
[52] U.S. Cl. ............................................................ 708/290
[58] Field of Search ............................................. 708/290

[56] References Cited

U.S. PATENT DOCUMENTS

| | | | |
|---|---|---|---|
| 4,837,722 | 6/1989 | Sara ......................................... | 708/290 |
| 4,951,244 | 8/1990 | Meyer ...................................... | 708/290 |
| 5,258,938 | 11/1993 | Akamatsu ................................ | 708/290 |
| 5,402,533 | 3/1995 | Kelley et al. ............................ | 708/290 |
| 5,886,911 | 3/1999 | Yang ........................................ | 708/290 |
| 5,922,043 | 7/1999 | Mais ........................................ | 708/290 |
| 5,935,198 | 8/1999 | Blomgren ................................ | 708/290 |
| 5,951,625 | 9/1999 | Duvanenko et al. .................... | 708/290 |

OTHER PUBLICATIONS

Interface, vol. 16, No. 12, Dec. 1, 1990, pp. 188–228.

*Primary Examiner*—David H. Malzahn
*Attorney, Agent, or Firm*—Foley & Lardner

[57] ABSTRACT

An interpolation circuit for calculating the value of an arbitrary point by interpolation using the values of points on the boundaries of a domain which surrounds the arbitrary point comprises a partial product generation circuit composed of multiplexers and a partial product addition circuit for adding partial products generated by the partial product generation circuit together. When an interpolated value $f(C)$ between $f(Ci)$ and $f(Ci+1)$ (where the integer part of C is Ci and the decimal part of C as a binary number of n digits is $c=C_{n-1}2^{n-1}+C_{n-2}2^{n-2}+\ldots+C_1 2^1+C_0 2^0$) is calculated by the interpolation circuit, each multiplexer $MPk+1$ ($k=0, 1, \ldots, n-2, n-1$) corresponding to $2^k$ of the decimal part c is supplied with two input values $f(Ci)$ and $f(Ci+1)$ and one selection signal Ck ($k=0, 1, \ldots, n-2, n-1$) respectively and outputs $f(Ci)$ or $f(Ci+1)$ depending on the selection signal Ck, and the interpolated value $f(C)$ is obtained by the partial product addition circuit by adding the outputs of the multiplexers $MPk+1$ ($k=0, 1, \ldots, n-2, n-1$) corresponding to $2^k$ as the partial products together. By use of the multiplexers as the partial product generation circuit, circuit composition of the interpolation circuit can be considerably simplified, and thus high speed interpolation calculation can be realized and systems which employ interpolation circuits can be miniaturized.

13 Claims, 10 Drawing Sheets

HIGH SPEED INTERPOLATION CIRCUIT WITH SMALL CIRCUIT SCALE

BACKGROUND OF THE INVENTION

The present invention relates to an interpolation circuit for calculating the value of an arbitrary point by means of interpolation using the values of points on the boundaries of a domain which surrounds the arbitrary point, and in particular, to an interpolation circuit in which miniaturization of circuit scale and high speed processing are attained.

DESCRIPTION OF THE PRIOR ART

Interpolation calculation programs employing approximate lines etc. are generally used for obtaining a value of an arbitrary point on a curved line, a curved surface, a curved space, etc. However, in systems such as color printers, televisions, etc. which are needed to handle color data with high speed, interpolation calculation by software can not attain necessary processing speed, and thus processing by means of hardware is employed at present. For example, in the case where the value of an arbitrary point in a curved space is obtained by hardware processing, the curved space is segmented into small domains to such an extent that each of the domains can be regarded as a linear space, and the values of the apexes of the small domains are prestored in memory. For obtaining the value of an arbitrary point in the curved space, the values of apexes of a region which surrounds the arbitrary point are read out from the memory, and the value of the arbitrary point is obtained by linear calculation. Such a method is generally called 'table look up method', etc.

Figure 1:
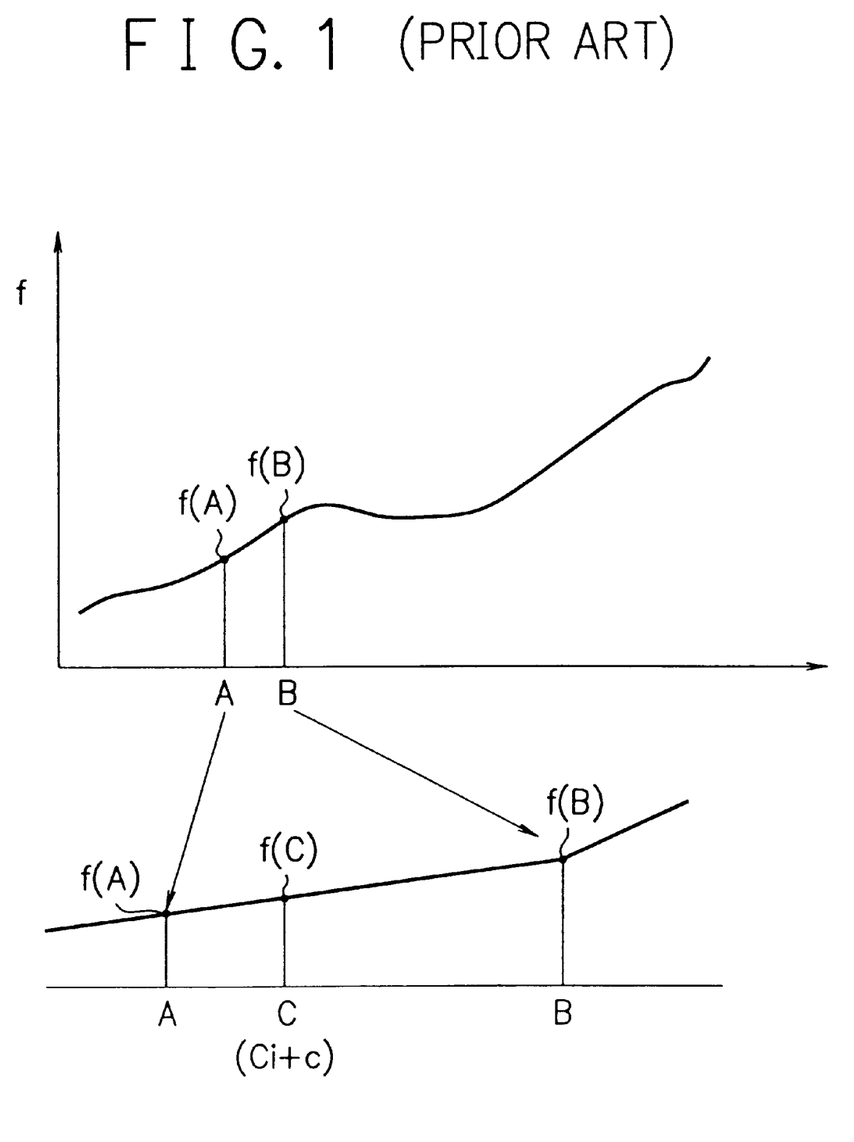
FIG. 1 is a schematic diagram explaining a one-dimensional interpolation method in two-dimensional space.

FIG. 1 is a schematic diagram explaining a one-dimensional interpolation method in two-dimensional space. Referring to FIG. 1, the curve representing a function f in the two-dimensional space can be regarded as linear between A and B, and the value f(C) of an arbitrary point C which exists between the A and B can be obtained as follows.

$$f(C)=\{(B-C)f(A)+(C-A)f(B)\}/(B-A) \quad (1)$$

In the case where A and B are integers in some unit and B−A=1 (unit length) and the integer part and the decimal part of C are Ci and c respectively, Ci is equal to A and c is equal to C−A, and thus the equation (1) can be transformed as:

$$f(C)=(1-c)f(Ci)+cf(Ci+1) \quad (2).$$

For execution of such calculation, values f(X) for a plurality of Xs at intervals of the unit length are prestored as a table in the memory, and f(Ci) and f(Ci+1) corresponding to the integer part Ci of C is read out from the table, and f(C) is obtained according to the equation (2) using the f(Ci) and f(Ci+1) and the decimal part c of C.

Figure 2:
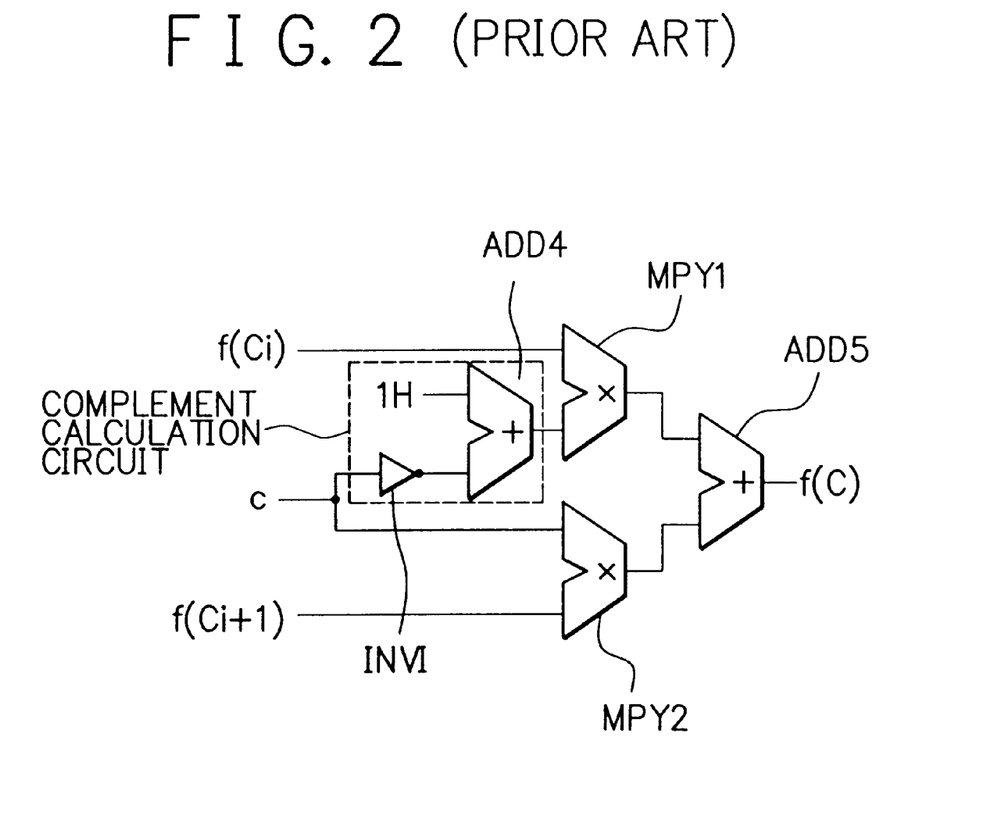
FIG. 2 is a circuit diagram showing an example of conventional hardware which has been proposed for obtaining interpolated values.

FIG. 2 is a circuit diagram showing an example of hardware which has been proposed for obtaining the interpolated value f(C). Referring to FIG. 2, the circuit comprises a complement calculation circuit for obtaining the complement (1−c) of c which is composed of an inverter INV1 and an adder ADD4, a multiplier MPYP1 for multiplying the complement (1−c) by f(Ci), a multiplier MPY2 for multiplying c by f(Ci+1), and an adder ADD5 for adding the outputs of the multipliers MPY1 and MPY2 together.

Figure 3:
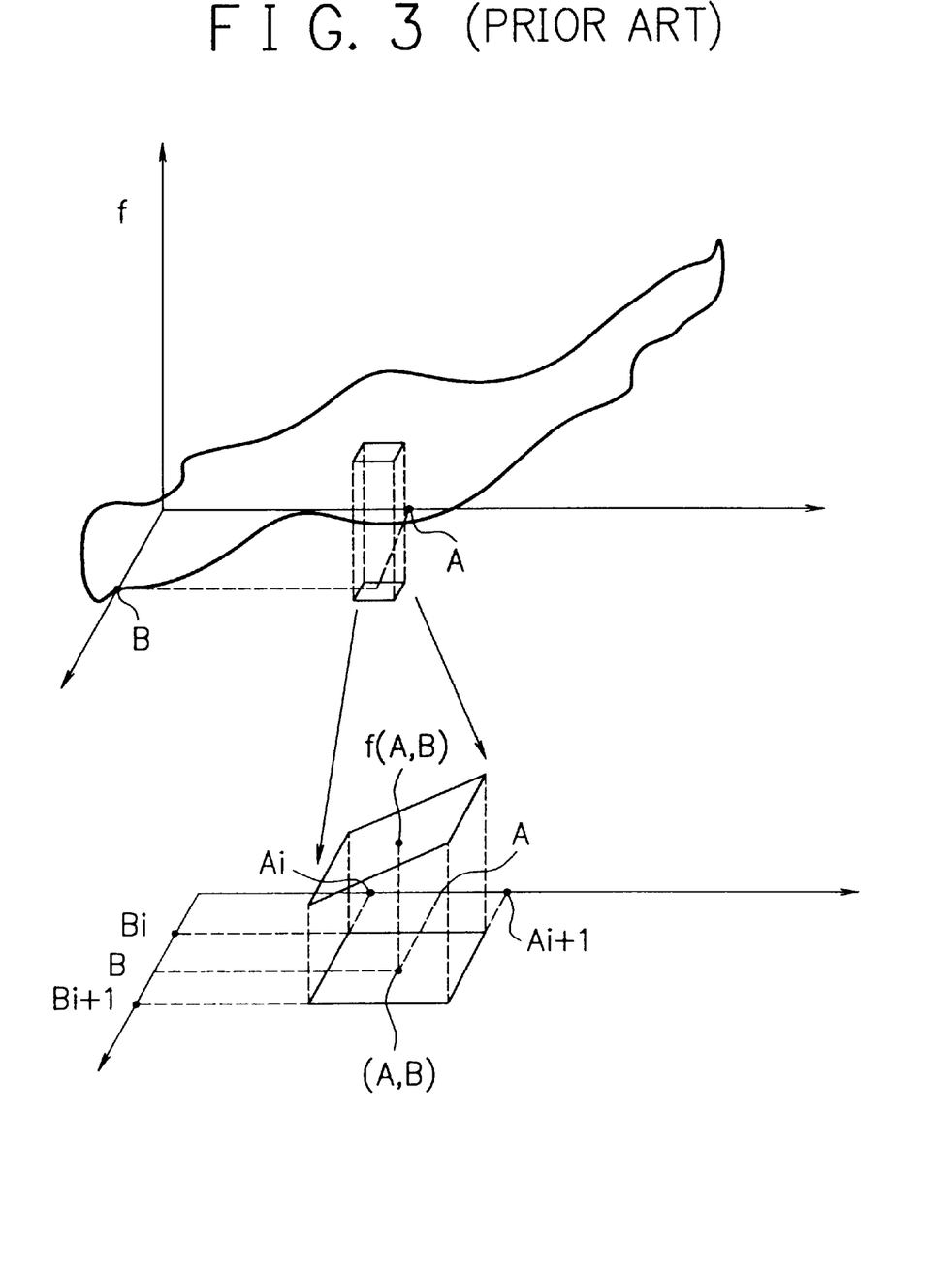
FIG. 3 is a schematic diagram explaining a two-dimensional interpolation method in three-dimensional space.

Two-dimensional interpolation calculation can also be performed in similar way to the one-dimensional interpolation method which has been described above. FIG. 3 is a schematic diagram explaining a two-dimensional interpolation method in three-dimensional space. Referring to FIG. 3, the two dimensional A-B plane and the curved f-surface in the three-dimensional space is segmented into small domains to such an extent that the function f can be regarded as linear in each of the domains, and the value f(A,B) on the curved surface corresponding to an arbitrary point (A,B) (i.e. the value f(A,B) of an arbitrary point (A,B)) can be obtained by two-dimensional interpolation using the values of points on the boundaries of a domain which surrounds the point (A,B). Here, if we represent the integer part and the decimal part of A (the X coordinate) as 'Ai' and 'a' respectively and the integer part and the decimal part of B (the Y coordinate) as 'Bi' and 'b' respectively in the same way as the case of the one-dimensional interpolation, the f(A,B) can be obtained by means of the two-dimensional interpolation as the following equation (3).

$$f(A, B)=(1-b)\{(1-a)f(Ai, Bi)+af(Ai+1, Bi)\}+b\{(1-a)f(Ai, Bi+1)+af(Ai+1, Bi+1)\} \quad (3)$$

Figure 4:
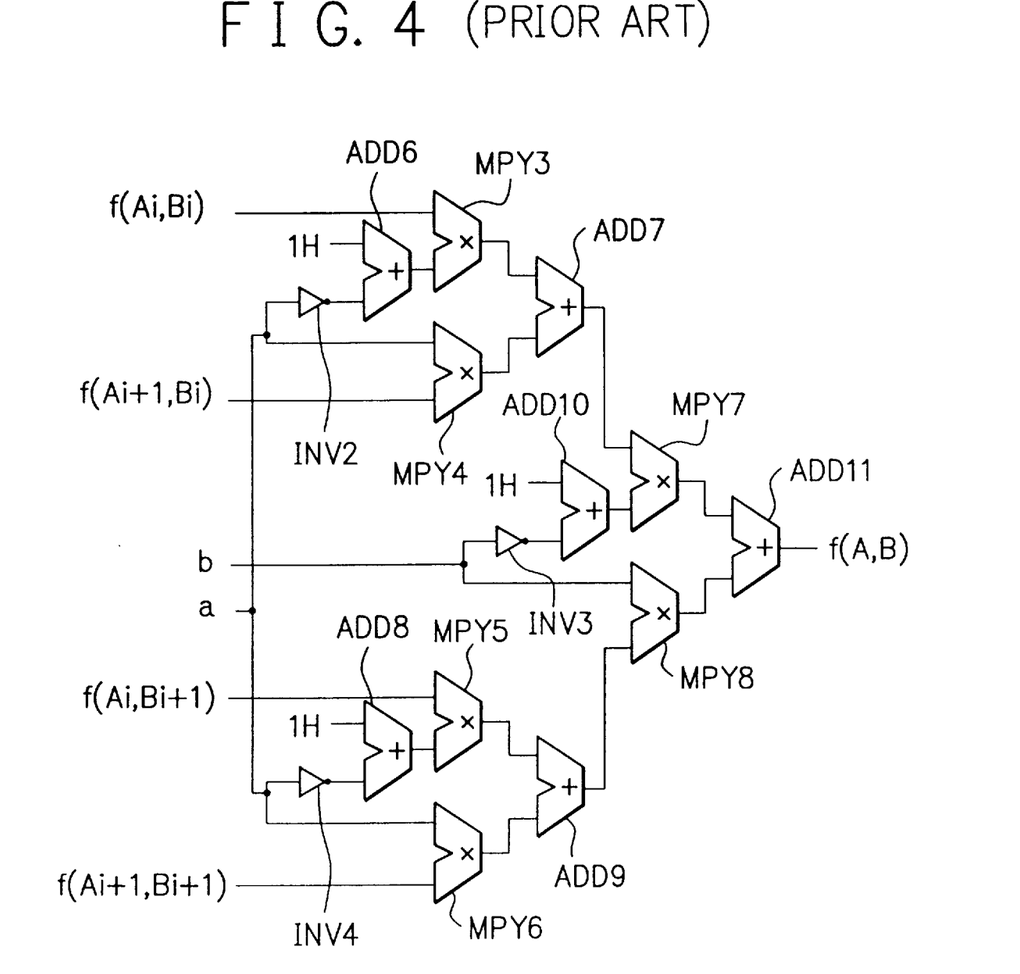
FIG. 4 is a circuit diagram showing an example of conventional hardware for performing two-dimensional interpolation.

Therefore hardware for performing the two-dimensional interpolation can be constructed, for example, by stacking two stages of the one-dimensional interpolation circuit of FIG. 2, as shown in FIG. 4. Referring to FIG. 4, the complement (1−a) of 'a' is obtained by the inverter INV2 and the adder ADD6 and by the inverter INV4 and the adder ADD8, and the complement (1−b) of b is obtained by the inverter INV3 and the adder ADD10. Multiplications with respect to 'a' or its complement (1−a) are executed by the multipliers MPY3 through MPY6, and addition of the multiplied terms are executed by the adders ADD7 and ADD9. The product of (1−b) and {(1−a)f(Ai, Bi)+af(Ai+1, Bi)} in the equation (3) is obtained by the multiplier MPY7 and the product of b and {(1−a)f(Ai, Bi+1)+af(Ai+1, Bi+1)} in the equation (3) is obtained by the multiplier MPY8. Then, the interpolated value f(A,B) is obtained by addition by the adder ADD11. Incidentally, although not shown here, hardware for performing three-dimensional interpolation can similarly be constructed by stacking three stages of the one-dimensional interpolation circuits. Interpolation circuits for four dimensions or more can also be constructed similarly.

In addition, in a technique which is disclosed in U.S. Pat. No. 4,837,722, the equation (3) in expanded form is used as follows.

$$f(A, B)=(1-b)(1-a)f(Ai, Bi)+(1-b)af(Ai+1, Bi)+b(1-a)f(Ai, Bi+1)+baf(Ai+1, Bi+1) \quad (4)$$

In to the technique, the interpolated value f(A,B) is obtained by calculating each of the expanded terms in the equation (4). Here, (1b)(1−a), (1−b)a, b(1−a) and ba are determined uniquely by 'a' and 'b', and thus those values do not have to be calculated on every operation of the interpolation circuit. Therefore, those values are calculated previously for every possible 'a' and 'b', and the values are stored as a ROM table. The values stored in the ROM table are read out from the ROM table on interpolation calculations by the interpolation circuit. For example, in the case where the resolution of calculation is ⅛, each of 'a' and 'b' can be 0, ⅛, 2/8, ⅜, 4/8, ⅝, 6/8 or ⅞. Therefore, (1−b)(1−a), (1−b)a, b(1−a) and ba previously calculated for eight pieces of 'a's and eight pieces of 'b's are stored in the ROM table.

Figure 5:
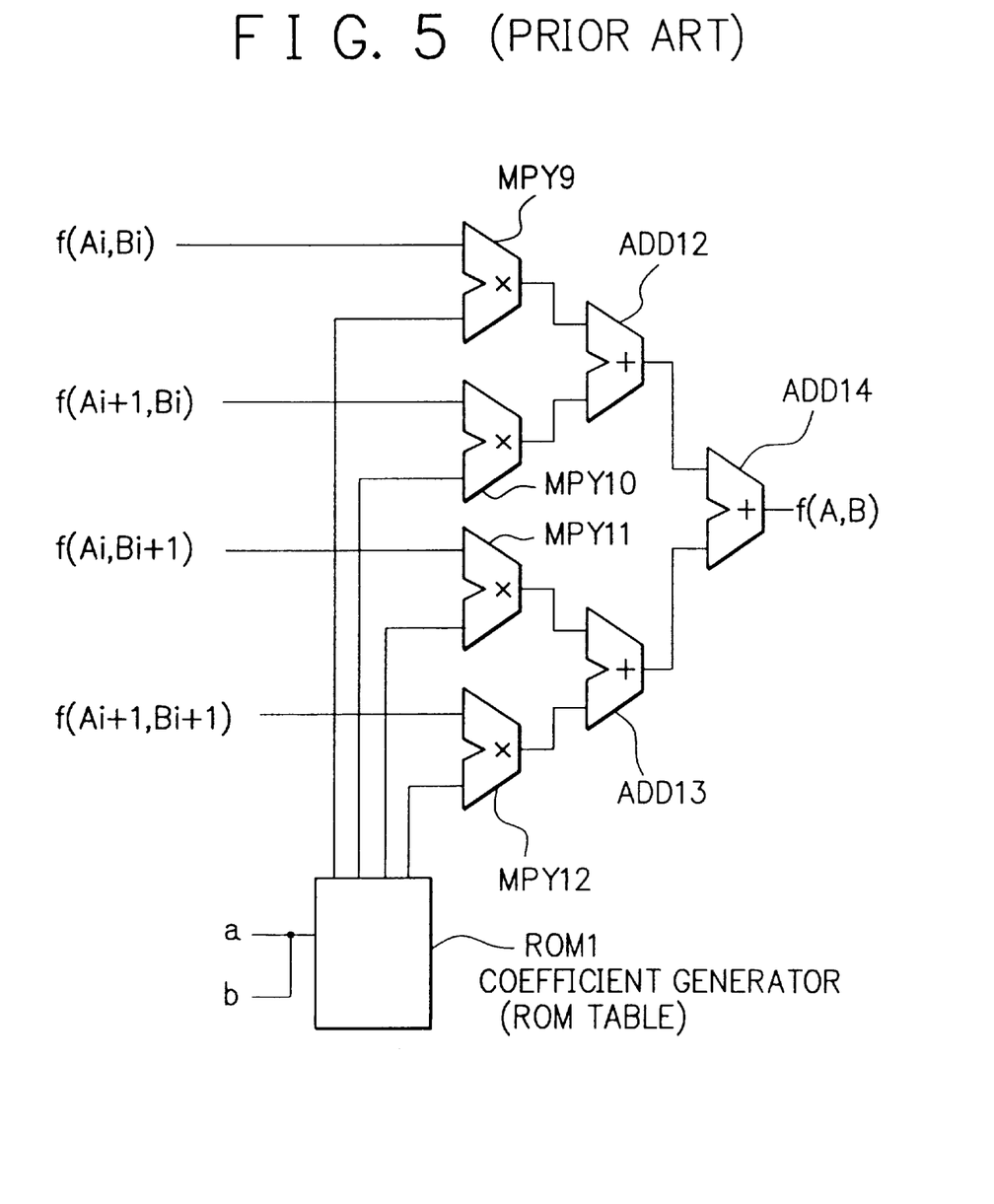
FIG. 5 is a circuit diagram showing another example of conventional hardware for performing two-dimensional interpolation.

According to the technique, during the f(Ai,Bi), f(Ai+1, Bi), f(Ai,Bi+1) and f(Ai+1,Bi+1) are read out from the look up table memory, the values (1−b)(1−a), (1−b)a, b(1−a) and ba can also be read out from the ROM table simultaneously. Thus, simple circuit composition as shown in FIG. 5 can be realized and calculation time can effectively be shortened. The technique is effective especially for multidimensional interpolation calculation.

However, there exist following problems in the conventional interpolation circuits having hardware composition that has been described above.

First, in systems which are required high speed data processing, the conventional interpolation circuits which have to handle large amount of data prevent speeding up of the operation speed of the whole system, since many stages of arithmetic logic operations have to be executed in the conventional interpolation circuits for processing data.

Second, when it is tried to speed up each operation circuit (such as an interpolation circuit) in a system in order to speed up the whole system, the sizes of the operation circuits are necessitated to be larger, and thus circuit scale of the whole system is necessitated to be larger. For realizing high speed operation, each transistor composing an operation circuit is required to have high driving ability. Such transistors with high driving ability are larger than ordinary transistors.

Third, although the technique proposed in U.S. Pat. No. 4,837,722 employing the ROM table can successfully increase the interpolation calculation speed, circuit scale of the interpolation circuit is necessitated to get larger than ordinary interpolation circuits, when multidimensional interpolation calculation is required, or when the number of bits of the decimal part is increased for high precision calculation and the ROM table is made larger.

SUMMARY OF THE INVENTION

It is therefore the primary object of the present invention to provide an interpolation circuit for calculating the value of an arbitrary point by interpolation using the values of points on the boundaries of a domain which surrounds the arbitrary point, in which circuit scale is miniaturized and processing speed is increased.

In accordance with a first aspect of the present invention, there is provided an interpolation circuit for calculating the value of an arbitrary point by interpolation using the values of points on the boundaries of a domain which surrounds the arbitrary point, comprising a partial product generation circuit and a partial product addition circuit for adding partial products generated by the partial product generation circuit together. Especially, the partial product generation circuit is composed of multiplexers, taking advantage of complement relationship in an interpolation equation.

In accordance with a second aspect of the present invention, in the first aspect, the partial product addition circuit is composed of a partial product adder and a final stage adder.

In accordance with a third aspect of the present invention, in the first aspect, when an interpolated value f(C) between f(Ci) and f(Ci+1) (where the integer part of C is Ci and the decimal part of C as a binary number of n digits is $c=C_{n-1}2^{n-1}+C_{n-2}2^{n-2}+ \ldots +C_1 2^1+C_0 2^0$) is calculated by the interpolation circuit, each multiplexer MPk+1 (k=0, 1, ..., n−2, n−1) corresponding to $2^k$ of the decimal part c is supplied with two input values f(Ci) and f(Ci+1) and one selection signal Ck (k=0, 1, ..., n−2, n−1) respectively and outputs f(Ci) or f(Ci+1) depending on the selection signal Ck, and the interpolated value f(C) is obtained by the partial product addition circuit by adding the outputs of the multiplexers MPk+1 (k=0, 1, ..., n−2, n−1) corresponding to $2^k$ as the partial products together.

In accordance with a fourth aspect of the present invention, in the third aspect, the input values f(Ci) and f(Ci+1) are prestored in one or more look up tables, and the input values f(Ci) and f(Ci+1) read out from the look up tables are supplied to the multiplexers.

In accordance with a fifth aspect of the present invention, in the fourth aspect, the look up tables are composed of an even table and an odd table.

In accordance with a sixth aspect of the present invention, there is provided an interpolation circuit for performing two-dimensional interpolation calculation. When an interpolated value f(A, B) corresponding to a point (A, B) which is surrounded by points (Ai, Bi), (Ai+1, Bi), (Ai, Bi+1) and (Ai+1, Bi+1) (where the integer part and the decimal part of A is Ai and 'a' and the integer part and the decimal part of B is Bi and b, respectively) is calculated by the interpolation circuit, first, interpolation in A-direction between values f(Ai, Bi) and f(Ai+1, Bi) is executed by a first stage one-dimensional interpolation circuit according to the third aspect using the decimal part 'a' of A, and interpolation in the A-direction between values f(Ai, Bi+1) and f(Ai+1, Bi+1) is executed by another first stage one-dimensional interpolation circuit according to the third aspect using the decimal part 'a', and thereby values f(A, Bi) and f(A, Bi+1) are obtained, and then, interpolation in B-direction between the values f(A, Bi) and f(A, Bi+1) is executed by a second stage one-dimensional interpolation circuit according to the third aspect using the decimal part b of B, and thereby the interpolated value f(A, B) is obtained.

In accordance with a seventh aspect of the present invention, in the sixth aspect, the values f(Ai, Bi), f(Ai+1, Bi), f(Ai, Bi+1) and f(Ai+1, Bi+1) are prestored in one or more look up tables, and the values f(Ai, Bi), f(Ai+1, Bi), f(Ai, Bi+1) and f(Ai+1, Bi+1) read out from the look up tables are supplied to the multiplexers of the first stage one-dimensional interpolation circuits.

In accordance with an eighth aspect of the present invention, in the seventh aspect, the look up tables are composed of an even-even table, an odd-even table, an even-odd table and an odd-odd table.

In accordance with a ninth aspect of the present invention, there is provided an interpolation circuit for performing three-dimensional interpolation calculation. When an interpolated value f(A, B, C) corresponding to a point (A, B, C) which is surrounded by points (Ai, Bi, Ci), (Ai+1, Bi, Ci), (Ai, Bi+1, Ci), (Ai+1, Bi+1, Ci), (Ai, Bi, Ci+1), (Ai+1, Bi, Ci+1), (Ai, Bi+1, Ci+1) and (Ai+1, Bi+1, Ci+1) (where the integer part and the decimal part of A is Ai and 'a', the integer part and the decimal part of B is Bi and b, and the integer part and the decimal part of C is Ci and c, respectively) is calculated by the interpolation circuit, first, interpolation in A-direction between values f(Ai, Bi, Ci) and f(Ai+1, Bi, Ci) is executed by a first stage one-dimensional interpolation circuit according to the third aspect using the decimal part 'a' of A, and interpolation in the A-direction between values f(Ai, Bi+1, Ci) and f(Ai+1, Bi+1, Ci) is executed by another first stage one-dimensional interpolation circuit according to the third aspect using the decimal part 'a', and interpolation in the A-direction between values f(Ai, Bi, Ci+1) and f(Ai+1, Bi, Ci+1) is executed by another first stage one-dimensional interpolation circuit according to the third aspect using the decimal part 'a', and interpolation in the A-direction between values f(Ai, Bi+1, Ci+1) and f(Ai+1, Bi+1, Ci+1) is executed by another first stage one-dimensional interpolation circuit according to the third aspect using the decimal part 'a', and thereby values f(A, Bi, Ci), f(A, Bi+1, Ci), f(A, Bi, Ci+1) and f(A, Bi+1, Ci+1) are obtained, and subsequently, interpolation in B-direction between the values f(A, Bi, Ci) and f(A, Bi+1, Ci) is executed by a second stage one-dimensional interpolation circuit according to the third aspect using the decimal part b of B, and interpolation in the B-direction between the values f(A, Bi, Ci+1) and f(A, Bi+1, Ci+1) is executed by another second stage one-dimensional interpolation circuit according to the third aspect using the decimal part b, and thereby values f(A, B, Ci) and f(A, B, Ci+1) are obtained, and then, interpolation in C-direction between the values f(A, B, Ci) and f(A, B, Ci+1) is executed by a third stage one-dimensional interpolation circuit according to the third aspect using the decimal part c of C, and thereby the interpolated value f(A, B, C) is obtained.

In accordance with a tenth aspect of the present invention, in the ninth aspect, the values f(Ai, Bi, Ci), f(Ai+1, Bi, Ci), f(Ai, Bi+1, Ci), f(Ai+1, Bi+1, Ci), f(Ai, Bi, Ci+1), f(Ai+1, Bi, Ci+1), f(Ai, Bi+1, Ci+1) and f(Ai+1, Bi+1, Ci+1) are prestored in one or more look up tables, and the values f(Ai, Bi, Ci), f(Ai+1, Bi, Ci), f(Ai, Bi+1, Ci), f(Ai+1, Bi+1, Ci), f(Ai, Bi, Ci+1), f(Ai+1, Bi, Ci+1), f(Ai, Bi+1, Ci+1) and f(Ai+1, Bi+1, Ci+1) read out from the look up tables are supplied to the multiplexers of the first stage one-dimensional interpolation circuits.

In accordance with an eleventh aspect of the present invention, in the tenth aspect, the look up tables are composed of an even-even-even table, an odd-even-even table, even-odd-even table, an odd-odd-even table, an even-even-odd table, an odd-even-odd table, an even-odd-odd table and an odd-odd-odd table.

In accordance with a twelfth aspect of the present invention, there is provided an interpolation circuit for performing N-dimensional interpolation calculation comprising N stages of one-dimensional interpolation units composed of one or more one-dimensional interpolation circuits. Each of the one-dimensional interpolation circuits includes a partial product generation circuit composed of multiplexers and a partial product addition circuit for adding partial products generated by the partial product generation circuit together. When one-dimensional interpolation calculation is executed and an interpolated value f( ..., C, ... ) between f( ..., Ci, ... ) and f( ..., Ci+1, ... ) (where the integer part of C is Ci and the decimal part of C as a binary number of n digits is $c=C_{n-1}2^{n-1}+C_{n-2}2^{n-2}+ \ldots +C_1 2^1+C_0 2^0$) is calculated by the one-dimensional interpolation circuit, each multiplexer MPk+1 (k=0, 1, ..., n−2, n−1) of the partial product generation circuit corresponding to $2^k$ of the decimal part c is supplied with two input values f( ..., Ci, ... ) and f( ..., Ci−1, ... ) and one selection signal Ck (k=0, 1, ..., n−2, n−1) respectively and outputs f( ..., Ci, ... ) or f( ..., Ci−1, ... ) depending on the selection signal Ck, and the interpolated value f( ..., C, ... ) is obtained by the partial product addition circuit by adding the outputs of the multiplexers MPk+1 (k=0, 1, ..., n−2, n−1) corresponding to $2^k$ as the partial products together. And the N-dimensional interpolation calculation is performed by the interpolation circuit, by successively executing the one-dimensional interpolation calculations in different independent directions by the N stages of one-dimensional interpolation units.

In accordance with a thirteenth aspect of the present invention, in the twelfth aspect, the input values which are supplied to the first stage one-dimensional interpolation unit are prestored in one or more look up tables, and the input values read out from the look up tables are supplied to the multiplexers of the one-dimensional interpolation circuits of the first stage one-dimensional interpolation unit.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Referring now to the drawings, a description will be given in detail of preferred embodiments in accordance with the present invention.

Figure 6:
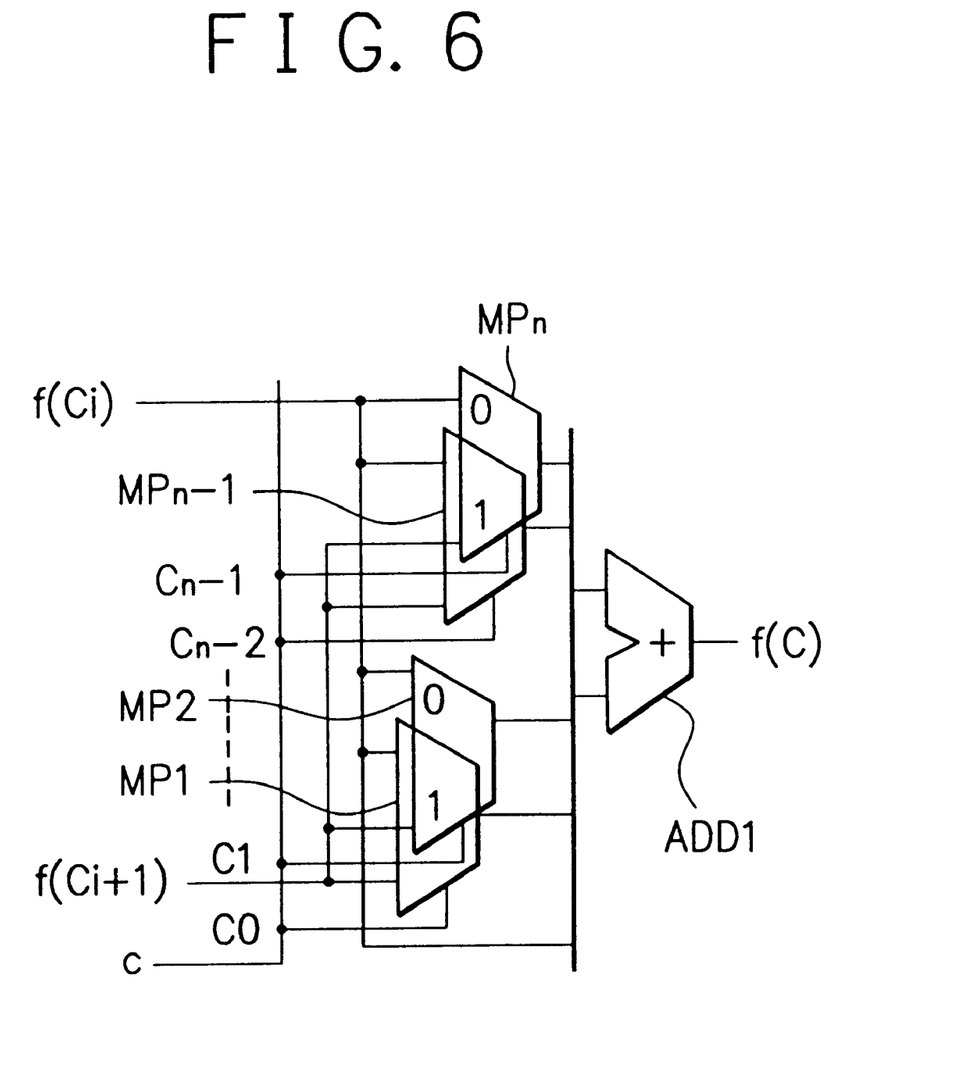
FIG. 6 is a circuit diagram showing an interpolation circuit according to an embodiment of the present invention.

FIG. 6 is a circuit diagram showing an interpolation circuit according to an embodiment of the present invention. The interpolation circuit of FIG. 6 performs one-dimensional interpolation calculation and obtains the interpolated value f(C) on the curve shown in FIG. 1 which corresponds to the point C between A and B.

As mentioned above, the interpolated value f(C) can be obtained as:

$$f(C)=(1-c)f(Ci)+cf(Ci+1) \tag{2}$$

where Ci and c are the integer part and the decimal part of C in some unit as defined above. Each of the decimal part c and its complement 1−c is handled by the interpolation circuit as a binary number of n digits. Therefore, hereafter, the decimal part c and its complement 1−c of the equation (2) multiplied by $2^n$ are also referred to as 'the decimal part c' and 'the complement 1−c'. The decimal part c (multiplied by $2^n$) can be expanded as:

$$c=C_{n-1}2^{n-1}+C_{n-2}2^{n-2}+ \ldots +C_1 2^1+C_0 2^0 \tag{5}$$

where $C_{n-1}, C_{n-2}, \ldots, C_0$ are coefficients which take on values of 0 or 1. The complement 1−c of c (multiplied by $2^n$) is expressed as:

$$1-c=C_{n-1}*2^{n-1}+C_{n-2}*2^{n-2}+ \ldots +C_1*2^1+C_0*2^0+1 \tag{6}$$

where * means the complementary value or the opposite value, that is, $C_{n-1}*=1$ when $C_{n-1}=0$, $C_{n-1}*=0$ when $C_{n-1}$, etc.

For executing calculations in the equation (2) concerning the f(Ci) and f(Ci+1) and the c and 1−c which are expanded as the equations (5) and (6), a partial product generation circuit is generally used.

Figure 7:
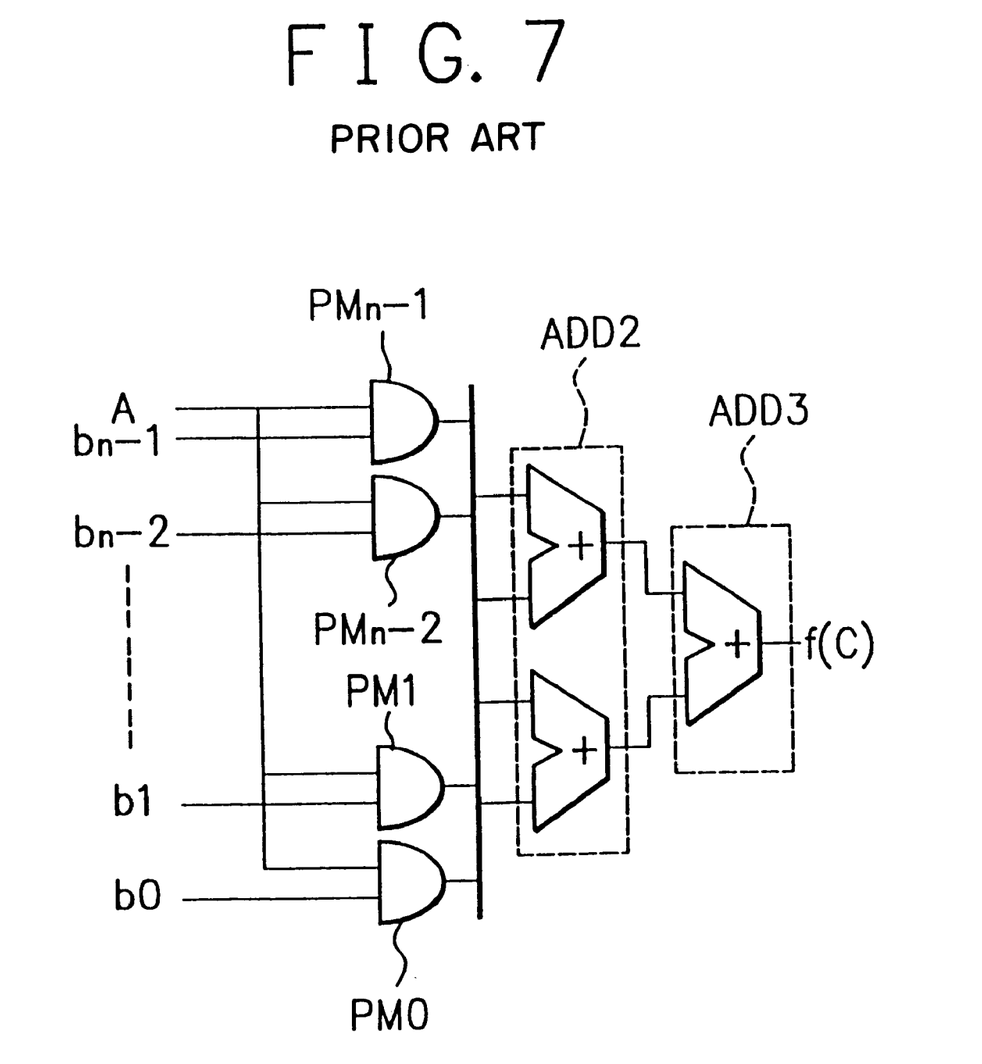
FIG. 7 is a circuit diagram showing an example of a conventional circuit for performing multiplication.

For instance, in order to obtain the product of A and $b_{n-1}+b_{n-2}+ \ldots +b_1+b_0$, n pieces of AND gates $PM_0 \sim PM_{n-1}$ (i.e. a partial product generation circuit) and a partial product addition circuit (composed of a partial product adder ADD2 and a final stage adder ADD3) as shown in FIG. 7 is generally used. The composition of FIG. 7 can also be employed for executing partial product calculations and additions in the equation (2) concerning the c, 1−c, f(Ci) and f(Ci+1). However, according to the circuit composition of FIG. 7, n pieces of AND gates $PM_0 \sim PM_{n-1}$ are necessary for executing the partial product calculations in the simple multiplication $A \times (b_{n-1}+b_{-2}+ \ldots +b_1+b_0)$, and thus the circuit for executing partial product calculations and additions for the equation (2) have to be complicated and need large-scale composition.

In order to resolve the problem, the interpolation circuit according to the present invention employs multiplexers or selectors as the partial product generation circuit, and thereby the two multiplications and one addition in the equation (2) can be executed by the interpolation circuit shown in FIG. 6 having circuit scale equivalent to a multiplier.

When $C=A \times B$ is calculated by the circuit of FIG. 7, each of the AND gates $PM_0 \sim PM_{n-1}$ composing the partial product generation circuit obtains logical products between each bit in A and one particular bit in B, and the partial products obtained by the AND gates $PM_0 \sim PM_{n-1}$ are added together by the partial product adder ADD2, and final addition is executed by the final stage adder ADD3 to obtain the result $C=A \times B$. Although various types of methods are proposed for executing the partial product addition and the final stage addition, normal methods for the partial product addition and the final stage addition are employed here. In the case where the number of bits of A is m and the number of bits of B is n, n−1 pieces of m-bit adders are necessary for the adders ADD2 and ADD3 as is evident from simple calculation. Although some adders become unnecessary if corresponding bits in B are 0, the values of such bits vary between 0 and 1 in actual calculation, therefore the number of adders can not be reduced. Referring to the equation (2), the number of bits for f(Ci) or f(Ci+1) is n and the number of bits for c or 1−c is m, and thus 2 mn pieces of partial products are generally generated. However, in the case where the multipliers (c and 1−c) are the complements of each other as in the equation (2), the number of partial products becomes only m(n+1). Taking advantage of the aforementioned property of the equation (2), simultaneous execution of two multiplication and one addition of the equation (2) only needs n pieces of adders, although 2n−1 pieces of adders are generally needed. Referring to FIG. 6, the partial product generation circuit in the interpolation circuit according to the present invention is composed of n pieces of multiplexers $MP_1 \sim MP_n$. Various types of multiplexers can be employed as the multiplexer in FIG. 6, such as a multiplexer composed of transfer gates, a multiplexer composed of NAND gates, a multiplexer composed of NOR gates, etc. The multiplexers $MP_1 \sim MP_n$ and the adder ADD1 shown in FIG. 6 are formed as an interpolation circuit in an LSI, etc. Incidentally, although only one adder ADD1 is shown in FIG. 6, the adder ADD1 is actually composed of a partial product adder and a final stage adder similarly to the case of FIG. 7.

Here, theoretical background of the interpolation circuit of FIG. 6 will be described in detail. Substitution of the equations (5) and (6) into the equation (2) yields the following equation (7).

$$f(C)=\{C_{n-1}*f(Ci)+C_{n-1}f(Ci+1)\}2^{n-1}+\{C_{n-2}*f(Ci)+C_{n-2}f(Ci+1)\}2^{n-2}+ \ldots +\{C_1*f(Ci)+C_1f(Ci+1)\}2^1+\{C_0*f(Ci)+C_0f(Ci+1)\}2^0+f(Ci)tm \quad (7)$$

Here, $C_{n-1}*=0$ when $C_{n-1}=1$ and $C_{n-1}=0$ when $C_{n-1}*=1$, therefore the first term on the right side of the equation (7) takes on values of f(Ci) $2^{n-1}$ or f(Ci+1) $2^{n-1}$. Similarly, $C_{n-2}*=0$ when $C_{n-2}=1$ and $C_{n-2}=0$ when $C_{n-2}*=1$, and thus the second term on the right side of the equation (7) takes on values of f(Ci) $2^{n-2}$ or f(Ci+1) $2^{n-2}$, and ditto for subsequent terms. Therefore, the interpolation calculation of the equation (7) can be performed by executing selection between f(Ci) and f(Ci+1) concerning each $2^k$ (k=0, 1, …, n−2, n−1) according to values of $C_k$ (k=0, 1, …, n−2, n−1). Referring to FIG. 6, each of the multiplexers MP1 through MPn is provided with three input terminals and one output terminal. Each multiplexer MPk+1 (k=0, 1, …, n−2, n−1) is supplied with two input values f(Ci) and f(Ci+1) and one selection signal Ck (k=0, 1, …, n−2, n−1) respectively, and outputs f(Ci) or f(Ci+1) depending on the selection signal Ck. The multiplexer MPk+1 outputs f(Ci) when the selection signal Ck is 0 and outputs f(Ci+1) when the selection signal Ck is 1 as the multiplier or coefficient of $2^k$ (k=0, 1, …, n−2, n−1) in the equation (7). The outputs f(Ci) or f(Ci+1) of the multiplexer MPk+1 (multiplied by $2^k$ respectively) are added together by the adder ADD1, and thereby the interpolated value f(C) is obtained. Incidentally, the input value f(Ci) is also supplied directly to the adder ADD1 in order to add the final term f(Ci) in the equation (7). By employing multiplexers for performing partial product calculation as shown above, circuit scale of the interpolation circuit can be miniaturized and high speed processing is made possible.

Figure 8:
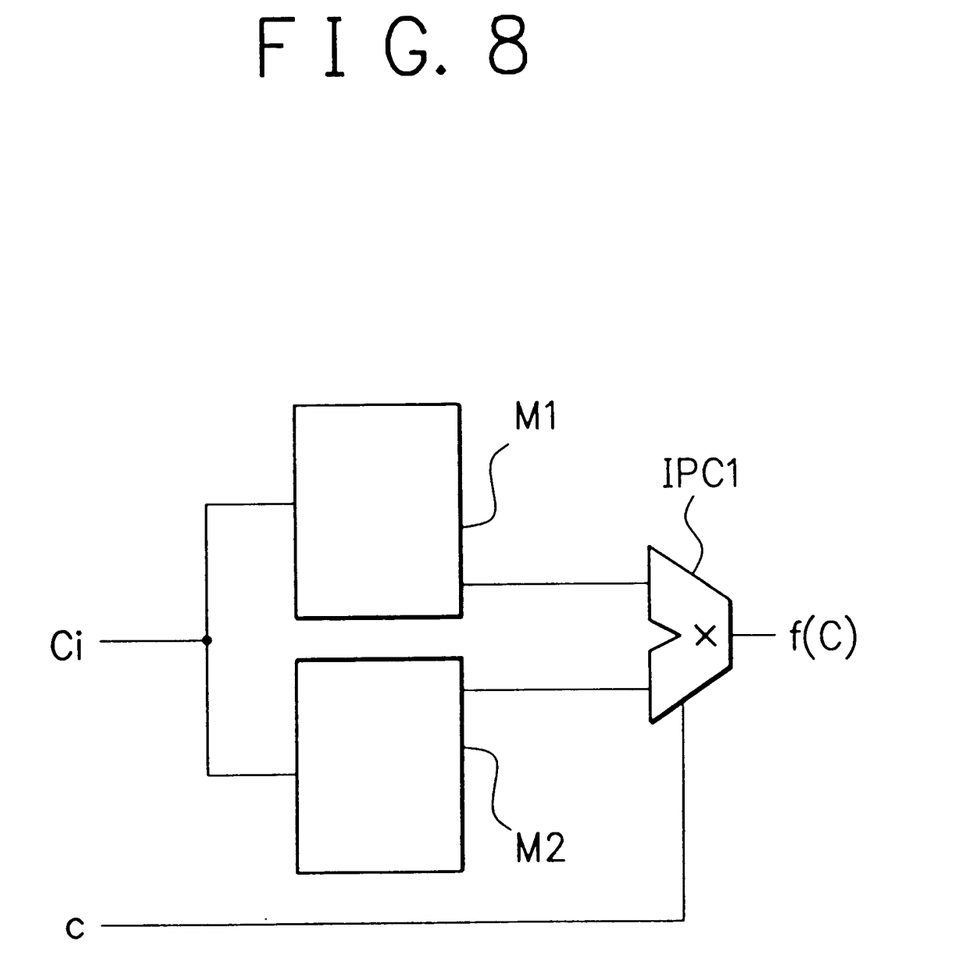
FIG. 8 is a block diagram showing a first example of an interpolation circuit according to the present invention for performing one-dimensional interpolation.

FIG. 8 is a block diagram showing a first example of an interpolation circuit according to the present invention for performing one-dimensional interpolation. The interpolated value to be obtained is f(C), and the integer part and the decimal part of C are Ci and c, respectively. In FIG. 8, IPC1 denotes an interpolation circuit according to the present invention which has been shown in FIG. 6. M1 denotes an 'even table' for a function f and M2 denotes an 'odd table' for the function f, that is, values f(0), f(2), f(4), … are stored in the even table M1 and values f(1), f(3), f(5), … are stored in the odd table M2. The even table M1 and the odd table M2 are formed in memory such as RAM, ROM, etc.

In the following, the operation of the interpolation circuit of FIG. 8 will be described. First, according to the integer part Ci of C, values f(Ci) and f(Ci+1) are read out from the tables M1 and M2. Then, the partial product calculation and addition concerning the values f(Ci) and f(Ci+1) and the decimal part c are executed by the interpolation circuit IPC1.

Figure 9:
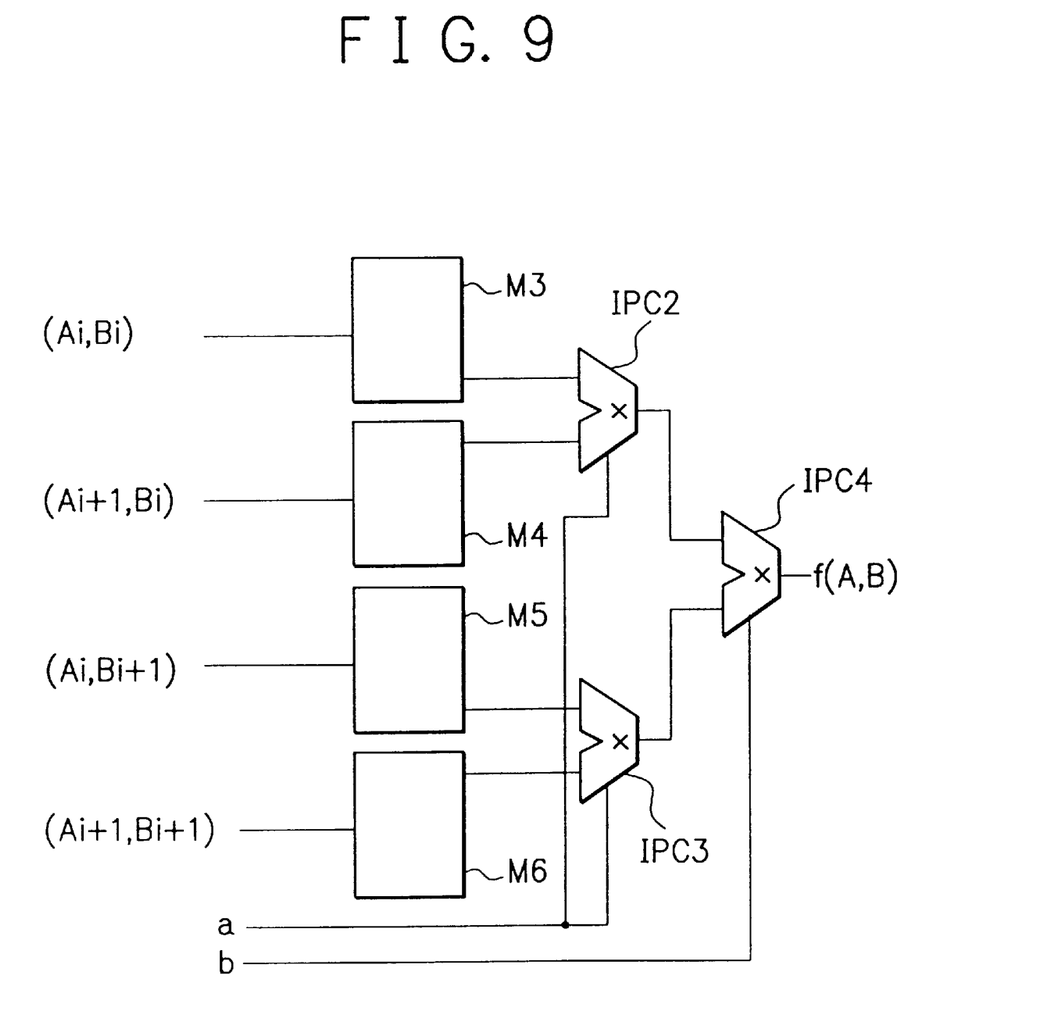
FIG. 9 is a block diagram showing a second example of an interpolation circuit according to the present invention for performing two-dimensional interpolation.

FIG. 9 is a block diagram showing a second example of an interpolation circuit according to the present invention for performing two-dimensional interpolation. The interpolated value to be obtained is f(A, B). The integer part and the decimal part of A are Ai and 'a', and the integer part and the decimal part of B are Bi and b, respectively. In FIG. 9, M3 denotes an 'even-even table' for a function f, M4 denotes an 'odd-even table' for the function f, M5 denotes an 'even-odd table' for the function f, and M6 denotes an 'odd-odd table' for the function f, that is, values f(0,0), f(2,0), f(0,2), f(4,0), f(2,2), f(0,4), f(6,0), … are stored in the even-even table M3, and values f(1,0), f(3,0), f(1,2), f(5,0), f(3,2), f(1,4), f(7,0), … are stored in the odd-even table M4, and values f(0,1), f(2,1), f(0,3), f(4,1), f(2,3), f(0,5), f(6,1), … are stored in the even-odd table M5, and values f(1,1), f(3,1), f(1,3), f(5,1), f(3,3), f(1,5), f(7,1), . . . are stored in the odd-odd table M6. The even-even table M3, the odd-even table M4, the even-odd table M5 and the odd-odd table M6 are formed in memory such as RAM, ROM, etc. The IPC2 through IPC4 are one-dimensional interpolation circuits according to the present invention which has been shown in FIG. 6. The one-dimensional interpolation circuits IPC2 and IPC3 are composing a first stage one-dimensional interpolation unit for performing one-dimensional interpolation in A-direction, and the one-dimensional interpolation circuit IPC4 is composing a second stage one-dimensional interpolation unit for performing one-dimensional interpolation in B-direction.

In the following, the operation of the interpolation circuit of FIG. 9 will be described. The operation which will be described below referring to FIG. 9 is a case where the integer parts Ai and Bi are both even numbers. However, the operation in other cases are basically the same. First, according to the integer parts Ai and Bi of A and B, values f(Ai, Bi), f(Ai+1, Bi), f(Ai, Bi+1) and f(Ai+1, Bi+1) are read out from the tables M3, M4, M5 and M6. Subsequently, interpolation in the A-direction between the values f(Ai, Bi) and f(Ai+1, Bi) is executed by the interpolation circuit IPC2 using the decimal part 'a' of A, and interpolation in the A-direction between the values f(Ai, Bi+1) and f(Ai+1, Bi+1) is executed by the interpolation circuit IPC3 using the decimal part 'a', and thereby values f(A, Bi) and f(A, Bi+1) are obtained. Then, interpolation in the B-direction between the values f(A, Bi) and f(A, Bi+1) is executed by the interpolation circuit IPC4 using the decimal part b of B, and thus the interpolated value f(A, B) is obtained.

Figure 10:
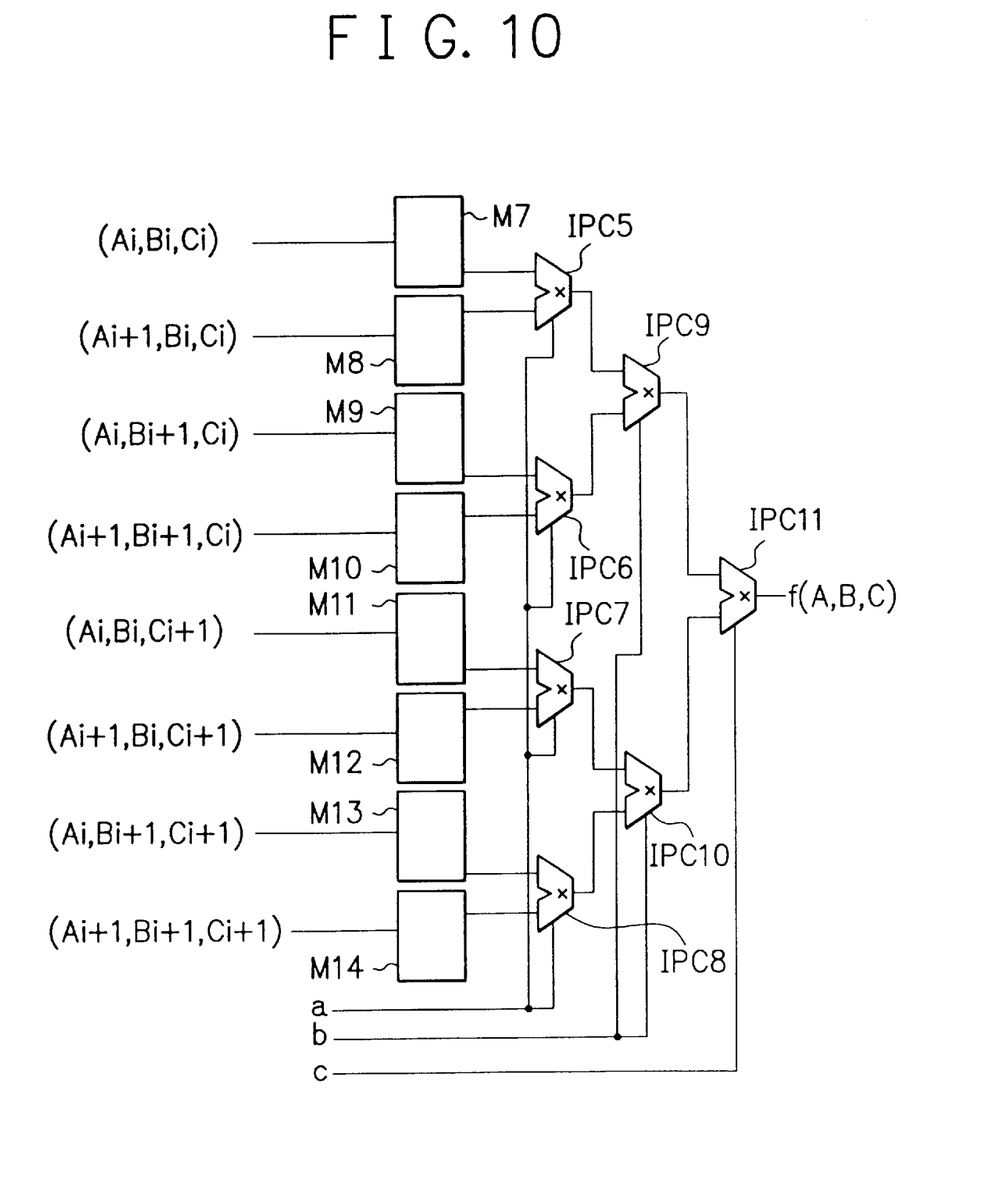
FIG. 10 is a block diagram showing a third example of an interpolation circuit according to the present invention for performing three-dimensional interpolation.

FIG. 10 is a block diagram showing a third example of an interpolation circuit according to the present invention for performing three-dimensional interpolation. The interpolated value to be obtained is f(A, B, C). The integer part and the decimal part of A are Ai and 'a', and the integer part and the decimal part of B are Bi and b, and the integer part and the decimal part of C are Ci and c, respectively. In FIG. 10, M7 denotes an 'even-even-even table' for a function f, M8 denotes an 'odd-even-even table' for the function f, M9 denotes an 'even-odd-even table' for the function f, M10 denotes an 'odd-odd-even table' for the function f, M11 denotes an 'even-even-odd table' for a function f, M12 denotes an 'odd-even-odd table' for the function f, M13 denotes an 'evenodd-odd table' for the function f, and M14 denotes an 'odd-odd-odd table' for the function f, that is, values f(0,0,0), f(2,0,0), f(0,2,0), f(4,0,2), f(4,0,0), f(2,2,0), f(2,0,2), f(0,4,0), f(0,2,2), f(0,0,4), f(6,0,0), . . . are stored in the even-even-even table M7, and values f(1,0,0), f(3,0,0), f(1,2,0), f(1,0,2), f(5,0,0), f(3,2,0), f(3,0,2), f(1,4,0), f(1,2,2), f(1,0,4), f(7,0,0), . . . are stored in the odd-even-even table M8, and values f(0,1,0), f(2,1,0), f(0,3,0), f(0,1,2), f(4,1,0), f(2,3,0), f(2,1,2), f(0,5,0), f(0,3,2), f(0,1,4), f(6,1,0), . . . are stored in the even-odd-even table M9, and values f(1,1,0), f(3,1,0), f(1,3,0), f(1,1,2), f(5,1,0), f(3,3,0), f(3,1,2), f(1,5,0), f(1,3,2), f(1,1,4), f(7,1,0), . . . are stored in the odd-odd-even table M10, and values f(0,0,1), f(2,0,1), f(0,2,1), f(0,0,3), f(4,0,1), f(2,2,1), f(2,0,3), f(0,4,1), f(0,2,3), f(0,0,5), f(6,0,1), . . . are stored in the even-even-odd table M11, and values f(1,0,1), f(3,0,1), f(1,2,1), f(1,0,3), f(5,0,1), f(3,2,1), f(3,0,3), f(1,4,1), f(1,2,3), f(1,0,5), f(7,0,1), . . . are stored in the odd-even-odd table M12, and values f(0,1,1), f(2,1,1), f(0,3,1), f(0,1,3), f(4,1,1), f(2,3,1), f(2,1,3), f(0,5,1), f(0,3,3), f(0,1,5), f(6,1,1), . . . are stored in the even-odd-odd table M13, and values f(1,1,1), f(3,1,1), f(1,3,1), f(1,1,3), f(5,1,1), f(3,3,1), f(3,1,3), f(1,5,1), f(1,3,3), f(1,1,5), f(7,1,1), . . . are stored in the odd-odd-odd table M14. The tables M7 through M14 are formed in memory such as RAM, ROM, etc. The IPC5 through IPC11 are one-dimensional interpolation circuits according to the present invention which has been shown in FIG. 6. The one-dimensional interpolation circuits IPC5 through IPC8 are composing a first stage one-dimensional interpolation unit for performing one-dimensional interpolation in A-direction, and the one-dimensional interpolation circuits IPC9 and IPC10 are composing a second stage one-dimensional interpolation unit for performing one-dimensional interpolation in B-direction, and the one-dimensional interpolation circuit IPC11 is composing a third stage one-dimensional interpolation unit for performing one-dimensional interpolation in C-direction.

In the following, the operation of the interpolation circuit of FIG. 10 will be described. The operation which will be described below referring to FIG. 10 is a case where the integer parts Ai, Bi and Ci are even numbers. However, the operation in other cases are basically the same. First, according to the integer parts Ai, Bi and Ci of A, B and C, values f(Ai, Bi, Ci), f(Ai+1, Bi, Ci), f(Ai, Bi+1, Ci), f(Ai+1, Bi+1, Ci), f(Ai, Bi, Ci+1), f(Ai+1, Bi, Ci+1), f(Ai, Bi+1, Ci+1), and f(Ai+1, Bi+1, Ci+1) are read out from the tables M7, M8, M9, M10, M11, M12, M13 and M14.

Subsequently, interpolation in the A-direction between the values f(Ai, Bi, Ci) and f(Ai+1, Bi, Ci) is executed by the interpolation circuit IPC5 using the decimal part 'a' of A, and interpolation in the A-direction between the values f(Ai, Bi+1, Ci) and f(Ai+1, Bi+1, Ci) is executed by the interpolation circuit IPC6 using the decimal part 'a', and interpolation in the A-direction between the values f(Ai, Bi, Ci+1) and f(Ai+1, Bi, Ci+1) is executed by the interpolation circuit IPC7 using the decimal part 'a', and interpolation in the A-direction between the values f(Ai, Bi+1, Ci+1) and f(Ai+1, Bi+1, Ci+1) is executed by the interpolation circuit IPC8 using the decimal part 'a', and thereby values f(A, Bi, Ci), f(A, Bi+1, Ci), f(A, Bi, Ci+1) and f(A, Bi+1, Ci+1) are obtained.

Subsequently, interpolation in the B-direction between the values f(A, Bi, Ci) and f(A, Bi+1, Ci) is executed by the interpolation circuit IPC9 using the decimal part b of B, and interpolation in the B-direction between the values f(A, Bi, Ci+1) and f(A, Bi+1, Ci+1) is executed by the interpolation circuit IPC10 using the decimal part b, and thereby the values f(A, B, Ci) and f(A, B, Ci+1) are obtained.

Then, interpolation in the C-direction between the values f(A, B, Ci) and f(A, B, Ci+1) is executed by the interpolation circuit IPC11 using the decimal part c of C, and thus the interpolated value f(A, B, C) is obtained.

Incidentally, it is of course possible to apply the interpolation circuit according to the present invention to interpolation circuits for performing interpolation of four dimensions or more.

As described above, in the interpolation circuit according to the present invention, the partial product generation circuit for obtaining partial products in interpolation calculation is composed of multiplexers, taking advantage of the complement relationship which has been shown in the equation (7). Therefore, circuit composition can be considerably simplified in comparison with conventional interpolation circuits which employ a lot of adders and multipliers, and thus high speed processing and miniaturization of interpolation circuits can be realized, and thereby miniaturization of systems which employ interpolation circuits can be attained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An interpolation circuit for calculating the value of an arbitrary point by interpolation using the values of points on the boundaries of a domain which surrounds the arbitrary point, comprising a partial product generation circuit and a partial product addition circuit for adding partial products generated by the partial product generation circuit together, wherein the partial product generation circuit is composed of multiplexers.

2. An interpolation circuit as claimed in claim 1, wherein the partial product addition circuit is composed of a partial product adder and a final stage adder.

3. An interpolation circuit as claimed in claim 1, wherein when an interpolated value f(C) between f(Ci) and f(Ci+1) (where the integer part of C is Ci and the decimal part of C as a binary number of n digits is $c=C_{n-1}2^{n-1}+C_{n-2}2^{n-2}+\ldots+C_1 2^1+C_0 2^0$) is calculated by the interpolation circuit, each multiplexer MPk+1 (k=0, 1, ..., n−2, n−1) corresponding to $2^k$ of the decimal part c is supplied with two input values f(Ci) and f(Ci+1) and one selection signal Ck (k=0, 1, ..., n−2, n−1) respectively and outputs f(Ci) or f(Ci+1) depending on the selection signal Ck, and the interpolated value f(C) is obtained by the partial product addition circuit by adding the outputs of the multiplexers MPk+1 (k=0, 1, ..., n−2, n−1) corresponding to $2^k$ as the partial products together.

4. An interpolation circuit as claimed in claim 3, wherein the input values f(Ci) and f(Ci+1) are prestored in one or more look up tables, and the input values f(Ci) and f(Ci+1) read out from the look up tables are supplied to the multiplexers.

5. An interpolation circuit as claimed in claim 4, wherein the look up tables are composed of an even table and an odd table.

6. An interpolation circuit for performing two-dimensional interpolation calculation, wherein:

when an interpolated value f(A, B) corresponding to a point (A, B) which is surrounded by points (Ai, Bi), (Ai+1, Bi), (Ai, Bi+1) and (Ai+i, Bi+1) (where the integer part and the decimal part of A is Ai and 'a' and the integer part and the decimal part of B is Bi and b, respectively) is calculated by the interpolation circuit, interpolation in A-direction between values f(Ai, Bi) and f(Ai+1, Bi) is executed by a first stage one-dimensional interpolation circuit using the decimal part 'a' of A, and interpolation in the A-direction between values f(Ai, Bi+i) and f(Ai+1, Bi+1) is executed by another first stage one-dimensional interpolation circuit using the decimal part 'a', and thereby values f(A, Bi) and f(A, Bi+1) are obtained, and then, interpolation in B-direction between the values f(A, Bi) and f(A, Bi+1) is executed by a second stage one-dimensional interpolation circuit using the decimal part b of B, and thereby the interpolated value f(A, B) is obtained, and wherein each of the one-dimensional interpolation circuits comprises:

a partial product generation circuit; and a partial product addition circuit for adding partial products generated by the partial product generation circuit together, wherein the partial product generation circuit is composed of multiplexers, and wherein, when an interpolated value f(X) between f(Xi) and f(Xi+1) (where the integer part of X is Xi and the decimal part of X as a binary number of n digits is $x=X_{n-1}2^{n-1}+X_{n-2}2^{n-2}+\ldots+X2^1+X_0 2^0$) is calculated by the interpolation circuit, each multiplexer MPk+1 (k=0, 1, ..., n−2, n−1) corresponding to $2^k$ of the decimal part x is supplied with two input values f(Xi) and f(Xi+1) and one selection signal Xk (k=0, 1, ..., n−2, n−1) respectively and outputs f(Xi) or f(Xi+1) depending on the selection signal Xk, and the interpolated value f(X) is obtained by the partial product addition circuit by adding the outputs of the multiplexers MPk+1 (k=0, 1, n−2, n−1) corresponding to $2^k$ as the partial products together.

7. An interpolation circuit as claimed in claim 6, wherein the values f(Ai, Bi), f(Ai+1, Bi), f(Ai, Bi+1) and f(Ai+1, Bi+1) are prestored in one or more look up tables, and the values f(Ai, Bi), f(Ai+1, Bi), f(Ai, Bi+1) and f(Ai+1, Bi+1) read out from the look up tables are supplied to the multiplexers of the first stage one-dimensional interpolation circuits.

8. An interpolation circuit as claimed in claim 7, wherein the look up tables are composed of an even-even table, an odd-even table, an even-odd table and an odd-odd table.

9. An interpolation circuit for performing three-dimensional interpolation calculation, wherein:

when an interpolated value f(A, B, C) corresponding to a point (A, B, C) which is surrounded by points (Ai, Bi, Ci), (Ai+1, Bi, Ci), (Ai, Bi+1, Ci), (Ai+1, Bi+1, Ci), (Ai, Bi, Ci+1), (Ai+1, Bi, Ci+1), (Ai, Bi+1, Ci+1) and (Ai+1, Bi+1, Ci+1) (where the integer part and the decimal part of A is Ai and 'a', the integer part and the decimal part of B is Bi and b, and the integer part and the decimal part of C is Ci and c, respectively) is calculated by the interpolation circuit, interpolation in A-direction between values f(Ai, Bi, Ci) and f(Ai+1, Bi, Ci) is executed by a first stage one-dimensional interpolation circuit using the decimal part 'a' of A, and interpolation in the A-direction between values f(Ai, Bi+1, Ci) and f(Ai+1, Bi+1, Ci) is executed by another first stage one-dimensional interpolation circuit using the decimal part 'a', and interpolation in the A-direction between values f(Ai, Bi, Ci+1) and f(Ai+1, Bi, Ci+1) is executed by another first stage one-dimensional interpolation circuit using the decimal part 'a', and interpolation in the A-direction between values f(Ai, Bi+1, Ci+1) and f(Ai+1, Bi+1, Ci+1) is executed by another first stage one-dimensional interpolation circuit using the decimal part 'a', and thereby values f(A, Bi, Ci), f(A, Bi+1, Ci), f(A, Bi, Ci+1) and f(A, Bi+1, Ci+1) are obtained, and subsequently, interpolation in B-direction between the values f(A, Bi, Ci) and f(A, Bi+1, Ci) is executed by a second stage one-dimensional interpolation circuit using the decimal part b of B, and interpolation in the B-direction between the values f(A, Bi, Ci+1) and f(A, Bi+1, Ci+1) is executed by another second stage one-dimensional interpolation circuit using the decimal part b, and thereby values f(A, B, Ci) and f(A, B, Ci+1) are obtained, and then, interpolation in C-direction between the values f(A, B, Ci) and f(A, B, Ci+1) is executed by a third stage one-dimensional interpolation circuit using the decimal part c of C, and thereby the interpolated value f(A, B, C) is obtained, and wherein each of the one-dimensional interpolation circuits comprises:

a partial product generation circuit; and a partial product addition circuit for adding partial products generated by the partial product generation circuit together, wherein the partial product generation circuit is composed of multiplexers, and wherein, when an interpolated value f(X) between f(Xi) and f(Xi+1) (where the integer part of X is Xi and the decimal part of X as a binary number of n digits is $x=X_{n-1}2^{n-1}+X_{n-2}2^{n-2}+\ldots+X2^1+X_02^0$) is calculated by the interpolation circuit, each multiplexer MPk+1 (k=0, 1, ..., n−2, n−1) corresponding to $2^k$ of the decimal part x is supplied with two input values f(Xi) and f(Xi+1) and one selection signal Xk (k=0, 1, ..., n−2, n−1) respectively and outputs f(Xi) or f(Xi+1) depending on the selection signal Xk, and the interpolated value f(X) is obtained by the partial product addition circuit by adding the outputs of the multiplexers MPk+1 (k=0, 1, ..., n−2, n−1) corresponding to $2^k$ as the partial products together.

10. An interpolation circuit as claimed in claim 9, wherein the values f(Ai, Bi, Ci), f(Ai+1, Bi, Ci), f(Ai, Bi+1, Ci), f(Ai+1, Bi+1, Ci), f(Ai, Bi, Ci+1), f(Ai+1, Bi, Ci+1), f(Ai, Bi+1, Ci+1) and f(Ai+1, Bi+1, Ci+1) are prestored in one or more look up tables, and the values f(Ai, Bi, Ci), f(Ai+1, Bi, Ci), f(Ai, Bi+1, Ci), f(Ai+1, Bi+1, Ci), f(Ai, Bi, Ci+1), f(Ai+1, Bi, Ci+1), f(Ai, Bi+1, Ci+1) and f(Ai+1, Bi+1, Ci+1) read out from the look up tables are supplied to the multiplexers of the first stage one-dimensional interpolation circuits.

11. An interpolation circuit as claimed in claim 10, wherein the look up tables are composed of an even-even-even table, an odd-even-even table, even-odd-even table, an odd-odd-even table, an even-even-odd table, an odd-even-odd table, an even-odd-odd table and an odd-odd-odd table.

12. An interpolation circuit for performing N-dimensional interpolation calculation comprising N stages of one-dimensional interpolation units composed of one or more one-dimensional interpolation circuits, each of the one-dimensional interpolation circuits including a partial product generation circuit composed of multiplexers and a partial product addition circuit for adding partial products generated by the partial product generation circuit together, wherein:

when one-dimensional interpolation calculation is executed and an interpolated value f( ..., C, ... ) between f( ..., Ci, ... ) and f( ..., Ci+1, ... ) (where the integer part of C is Ci and the decimal part of C as a binary number of n digits is $c=C_{n-1}2^{n-1}+C_{n-2}2^{n-2}+\ldots+C_1 2^1+C_0 2^0$) is calculated by the one-dimensional interpolation circuit, each multiplexer MPk+1 (k=0, 1, ..., n−2, n−1) of the partial product generation circuit corresponding to $2^k$ of the decimal part c is supplied with two input values f( ..., Ci, ... ) and f( ..., Ci+1, ... ) and one selection signal Ck (k=0, 1, ..., n−2, n−1) respectively and outputs f( ..., Ci, ... ) or f( ..., Ci+1, ... ) depending on the selection signal Ck, and the interpolated value f( ..., C, ... ) is obtained by the partial product addition circuit by adding the outputs of the multiplexers MPk+1 (k=0, 1, ..., n−2, n−1) corresponding to $2^k$ as the partial products together, and the N-dimensional interpolation calculation is performed by the interpolation circuit, by successively executing the one-dimensional interpolation calculations in different independent directions by the N stages of one-dimensional interpolation units.

13. An interpolation circuit as claimed in claim 12, wherein the input values which are supplied to the first stage one-dimensional interpolation unit are prestored in one or more look up tables, and the input values read out from the look up tables are supplied to the multiplexers of the one-dimensional interpolation circuits of the first stage one-dimensional interpolation unit.

* * * * *